United States Patent
Hsieh et al.

(10) Patent No.: US 11,041,708 B2
(45) Date of Patent: Jun. 22, 2021

(54) ANGLE SENSING DEVICE

(71) Applicant: iSentek Inc., New Taipei (TW)

(72) Inventors: Wei-An Hsieh, New Taipei (TW);
Fu-Te Yuan, New Taipei (TW);
Yen-Chi Lee, New Taipei (TW)

(73) Assignee: iSentek Inc., New Taipei (TW)

( * ) Notice: Subject to any disclaimer, the term of this patent is extended or adjusted under 35 U.S.C. 154(b) by 46 days.

(21) Appl. No.: 16/590,390

(22) Filed: Oct. 2, 2019

(65) Prior Publication Data

US 2020/0132433 A1 Apr. 30, 2020

Related U.S. Application Data

(60) Provisional application No. 62/751,682, filed on Oct. 28, 2018.

(30) Foreign Application Priority Data

Jul. 16, 2019 (TW) ................................ 108125081

(51) Int. Cl.
*G01B 7/30* (2006.01)
(52) U.S. Cl.
CPC ...................... *G01B 7/30* (2013.01)
(58) Field of Classification Search
CPC ...................................................... G01B 7/30
See application file for complete search history.

(56) References Cited

U.S. PATENT DOCUMENTS

| | | | |
|---|---|---|---|
| 2003/0030432 A1 | 2/2003 | Buchhold | |
| 2007/0283587 A1* | 12/2007 | Cerwin | G01B 7/30 33/471 |
| 2009/0115405 A1 | 5/2009 | Guo et al. | |
| 2010/0106454 A1 | 4/2010 | Sengupta | |
| 2016/0299606 A1* | 10/2016 | Go | G06F 3/04883 |
| 2017/0139663 A1* | 5/2017 | Ahn | G06F 1/1618 |

(Continued)

FOREIGN PATENT DOCUMENTS

| | | |
|---|---|---|
| CN | 200959021 | 10/2007 |
| CN | 102472638 | 5/2012 |
| CN | 204064233 | 12/2014 |

(Continued)

OTHER PUBLICATIONS

"Office Action of Taiwan Counterpart Application", dated May 26, 2020, p. 1-p. 6.

(Continued)

*Primary Examiner* — Reena Aurora
(74) *Attorney, Agent, or Firm* — JCIPRNET

(57) ABSTRACT

An angle sensing device including a first object, a second object, a magnetic field source, and a first magnetic sensor is provided. The second object is adapted to be rotated with respect to the first object, so that an inclined angle of the second object with respect to the first object is changed. The magnetic field source is connected to the second object. The first magnetic sensor is connected to the first object, and configured to sense a magnetic field generated by the magnetic field source. When the second object is rotated with respect to the first object, the magnetic field sensed by the first magnetic sensor changes, so that an output signal of the first magnetic sensor corresponding to the magnetic field changes.

9 Claims, 6 Drawing Sheets

(56) References Cited

U.S. PATENT DOCUMENTS

2020/0125144 A1* 4/2020 Chung ................ G06F 3/0481

FOREIGN PATENT DOCUMENTS

| CN | 104422386 |   | 4/2017  |
|----|-----------|---|---------|
| CN | 206583404 |   | 10/2017 |
| CN | 206891452 |   | 1/2018  |
| CN | 209105239 | * | 7/2019  |
| TW | M448672   |   | 3/2013  |
| TW | 1519805   |   | 2/2016  |

OTHER PUBLICATIONS

"Office Action of China Counterpart Application", dated Mar. 3, 2021, pp. 1-6, TWCNP201954995.

* cited by examiner

ANGLE SENSING DEVICE

CROSS-REFERENCE TO RELATED APPLICATION

This application claims the priority benefits of U.S. provisional application Ser. No. 62/751,682, filed on Oct. 28, 2018, and Taiwan application serial no. 108125081, filed on Jul. 16, 2019. The entirety of each of the above-mentioned patent applications is hereby incorporated by reference herein and made a part of this specification.

BACKGROUND

Technical Field

The disclosure relates to a sensing device, and in particular to an angle sensing device.

Description of Related Art

An angle sensing technology has been broadly applied to consumer electronics, industrial automation, vehicles and aerospace fields. Angle sensing may be divided as contact and non-contact angle sensing. A main advantage of non-contact angle sensing is that abrasion will not occur; therefore, non-contact angle sensing can still provide reliable efficacy under a long-term usage.

A magnetic sensing type non-contact angle sensing is one of the main angle sensing technologies, and is broadly applied to various fields, having a significant effect of anti-environmental interference (such as anti-dust, oil-resistance, and anti-mechanical vibration).

In a traditional magnetic sensing type angle sensing technology, a magnetic sensor and a magnet or a magnetic encoder are disposed in a rotating shaft, and such a method of rotation angle monitoring is broadly applied in industrial or vehicle field. However, in the application that a sensor is not allowed to be installed in a rotating shaft, the magnetic sensing type angle sensing technology is unable to be used.

SUMMARY

The disclosure provides an angle sensing device, which may implement angle sensing without installing a sensor on a rotating shaft.

An embodiment of the disclosure provides an angle sensing device, including a first object, a second object, a magnetic field source, and a first magnetic sensor. The second object is adapted to be rotated with respect to the first object, so that an inclined angle of the second object with respect to the first object is changed. The magnetic field source is connected to the second object. The first magnetic sensor is connected to the first object and is configured to sense a magnetic field generated by the magnetic field source. When the second object is rotated with respect to the first object, the magnetic field sensed by the first magnetic sensor changes, so that an output signal of the first magnetic sensor corresponding to the magnetic field changes.

In an angle sensing device of an embodiment of the disclosure, a method of connecting a first magnetic sensor and a magnetic field source respectively to a first object and a second object, and using the first magnetic sensor to sense a change of a magnetic field generated by the magnetic field source is adopted to measure an angle between a first object and a second object. Therefore, the angle sensing device of the embodiment of the disclosure may implement angle sensing without installing a magnetic sensor on a rotating shaft.

In order to make the features and advantages of the disclosure mentioned above more understandable, embodiments will be described in detail below with reference to the accompanying drawings.

DESCRIPTION OF THE EMBODIMENTS

Figure 1:
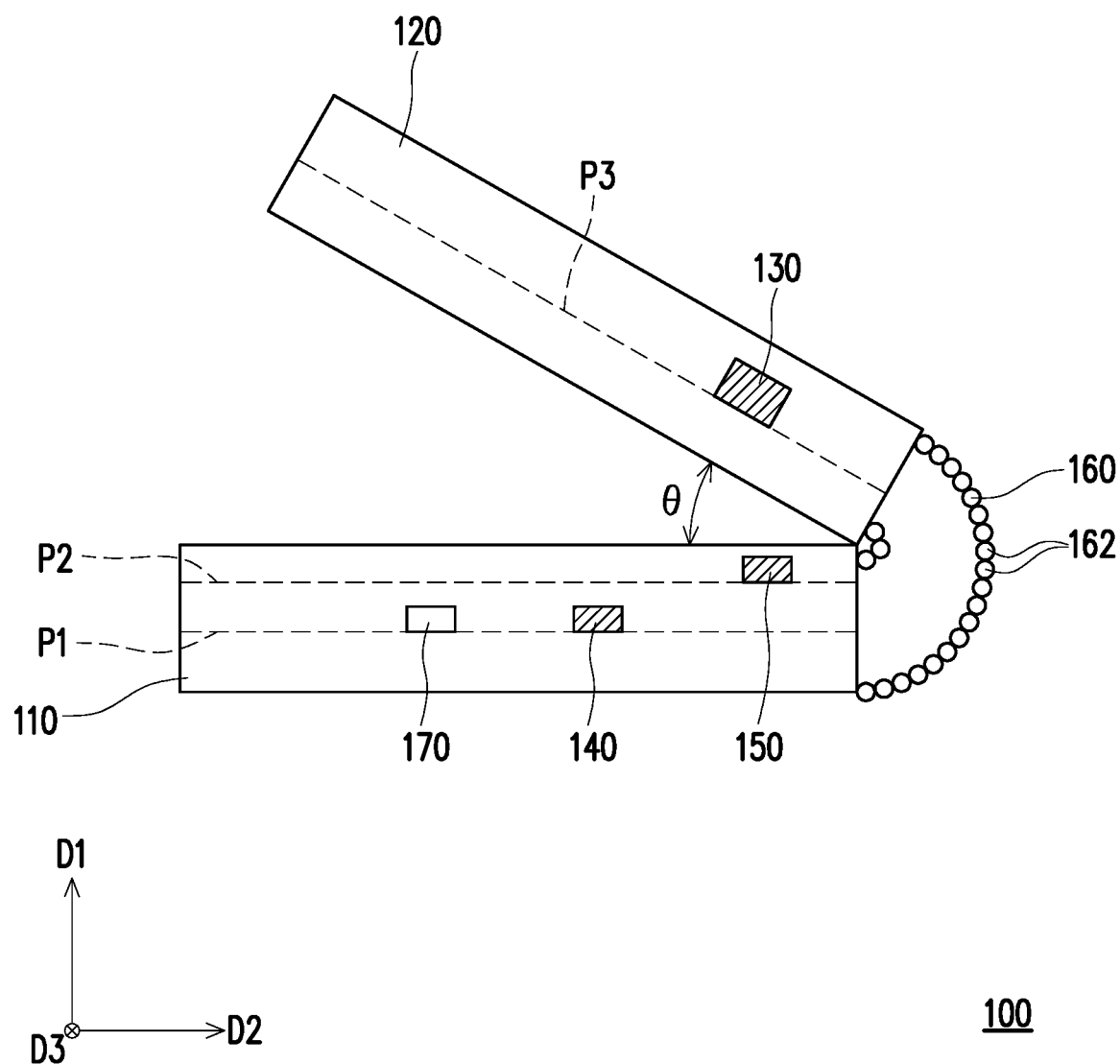
FIG. 1 is a sectional schematic view of an angle sensing device of an embodiment of the disclosure.

FIG. 1 is a sectional schematic view of an angle sensing device of an embodiment of the disclosure. Please refer to FIG. 1. An angle sensing device 100 of the present embodiment includes a first object 110, a second object 120, a magnetic field source 130 and a first magnetic sensor 140. The second object 120 is adapted to be rotated with respect to the first object 110, so that an inclined angle θ of the second object 120 with respect to the first object 110 is changed. In the present embodiment, the first object 110 and the second object 120 are two substrates, which, for example, may be respectively a base and an upper cover (such as a screen) of a notebook computer, or two components of other devices that may rotate with respect to each other.

The magnetic field source 130 is connected to the second object 120. The first magnetic sensor 140 is connected to the first object 110, and is configured to sense a magnetic field generated by the magnetic field source 130. In the present embodiment, the magnetic field source 130 is, for example, a permanent magnet or an electric magnet. The present embodiment takes an example of disposing the magnetic field source 130 in the second object 120, but in other embodiments, the magnetic field source 130 may also be disposed on a surface of the second object 120. In addition, the present embodiment takes an example of disposing the first magnetic sensor 140 in the first object 110, but, in other embodiments, the first magnetic sensor 140 may also be disposed on a surface of the first object 110.

When the second object 120 is rotated with respect to the first object 110, a magnetic field generated by the magnetic field source 130 sensed by the first magnetic sensor 140 changes, so that an output signal of the first magnetic sensor 140 corresponding to the magnetic field changes. Therefore, the size of the inclined angle θ may be determined according to the output signal.

In the angle sensing device 100 of the present embodiment, a method of connecting the first magnetic sensor 140 and the magnetic field source 130 respectively to the first object 110 and the second object 120, and using the first magnetic sensor 140 to sense a change of the magnetic field generated by the magnetic field source 130 is adopted to measure an angle between the first object 110 and the second object 120. Therefore, the angle sensing device 100 of the present embodiment may implement angle sensing without installing the magnetic sensor on the rotating shaft.

In the present embodiment, the angle sensing device 100 further includes a second magnetic sensor 150 connected to the first object 110 and configured to sense the magnetic field generated by the magnetic field source 130. Since a position of the second magnetic sensor 150 on the first object 110 is different than a position of the first magnetic sensor 140 on the first object 110, when the second object 120 is rotated with respect to the first object 110, a change of the magnetic field sensed by the first magnetic sensor 140 is different that a change of the magnetic field sensed by the second magnetic sensor 150. The present embodiment takes an example of disposing the second magnetic sensor 150 in the first object 110, but in other embodiments, the second magnetic sensor 150 may also be disposed on the surface of the first object 110.

Figure 2:
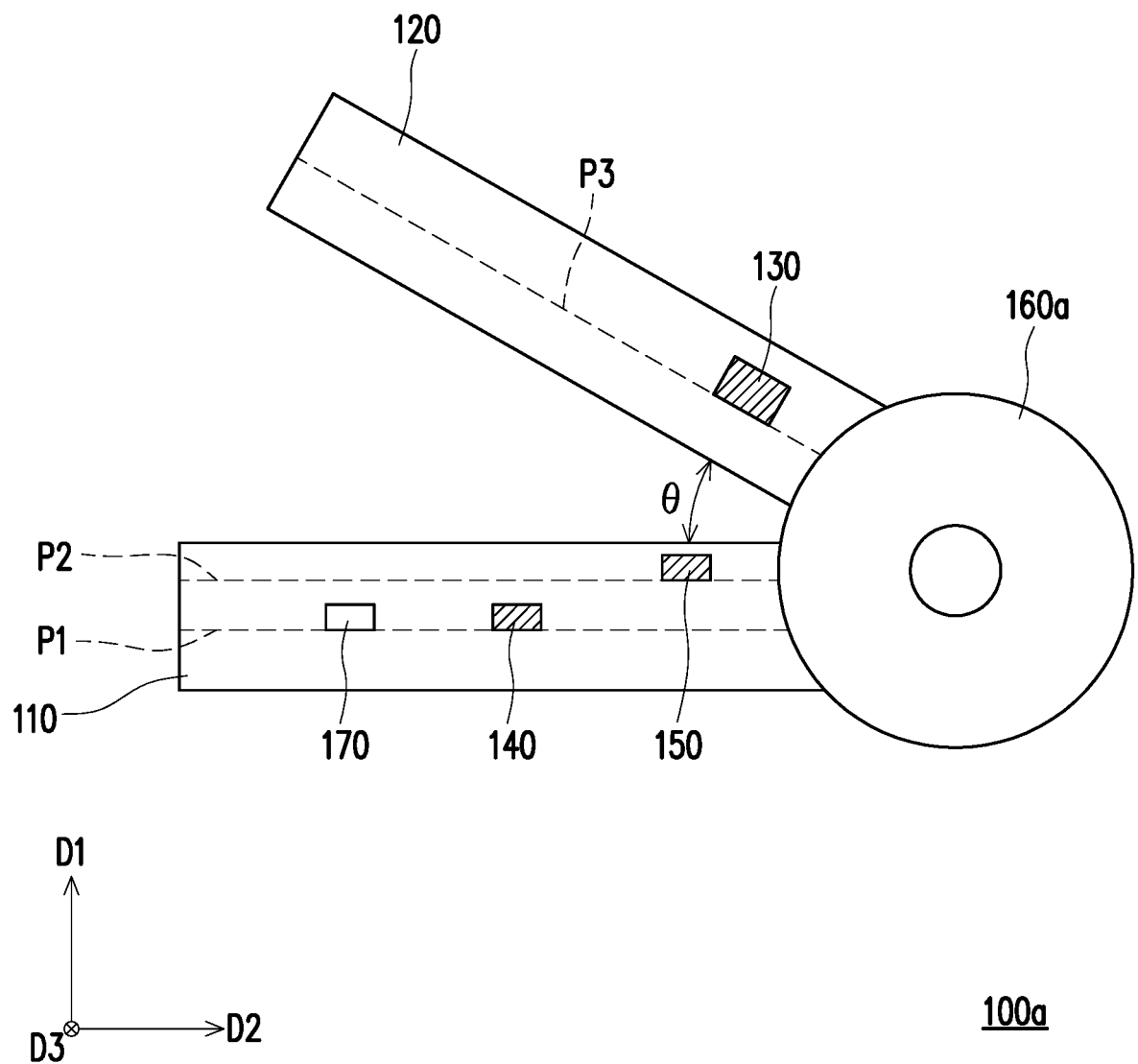
FIG. 2 is a sectional schematic view of an angle sensing device of another embodiment of the disclosure.

In the present embodiment, the angle sensing device 100 further includes a rotating gear 160 connected to the first object 110 and the second object 120, wherein the second object 120 is rotated with respect to the first object 110 through the rotating gear 160, and the first magnetic sensor 140, the second magnetic sensor 150 and the magnetic field source 130 are all disposed outside the rotating gear 160. In the present embodiment, the rotating gear 160 is a rotating gear having connected multiple shafts 162, wherein these shafts 162 are parallel to a third direction D3, which is perpendicular to a direction where the inclined angle θ spreads. However, in another embodiment, as shown in FIG. 2, a rotating gear 160a of an angle sensing device 100a may be a single-shaft rotating gear, which is a single rotating shaft. Besides, in other embodiments, the rotating gear 160 may also be a deformable component, such as a component with a changeable bending shape, so that the inclined angle θ of the second object 120 with respect to the first object 110 may be changed. Alternatively, the rotating gear 160 may be any gear which allows the inclined angle θ to be changeable.

In the present embodiment, the first magnetic sensor 140 and the second magnetic sensor 150 are respectively located on a first reference plane P1 and a second reference plane P2, and the magnetic field source 130 is located on a third reference plane P3. The first reference plane P1, the second reference plane P2 and the third reference plane P3 are all parallel to a rotating shaft of the second object 120 rotating with respect to the first object 110, which means that they are parallel to the third direction D3. The first reference plane P1 is parallel to the second reference plane P2, and when the second object 120 is rotated with respect to the first object 110, an inclined angle (equivalent to the inclined angle θ) of the third reference plane P3 with respect to the first reference plane P1 is changed. In the present embodiment, the angle sensing device 100 may be considered as being in a space constructed by a first direction D1, a second direction D2 and the third direction D3, wherein the first direction D1, the second direction D2 and the third direction D3 are perpendicular to one another and the first reference plane P1 is parallel to a plane constructed by the second direction D2 and the third direction D3.

In the present embodiment, an orthographic projection of the second magnetic sensor 150 on the first reference plane P1 does not overlap with the first magnetic sensor 140. Besides, in the present embodiment, a distance between the orthographic projection of the second magnetic sensor 150 on the first reference plane P1 and a rotating shaft (which is the rotating shaft of the second object 120 rotating with respect to the first object 110) is different from a distance between the first magnetic sensor 140 and the rotating shaft. In other words, positions of the first magnetic sensor 140 and the second magnetic sensor 150 on the second direction D2 are different, and their positions on the first direction D1 are different as well. Therefore, when the second object is rotated with respect to the first object 110, a change of the magnetic field sensed by the first magnetic sensor 140 may be different from a change of the magnetic field sensed by the second magnetic sensor 150.

The first magnetic sensor 140 and the second magnetic sensor 150 may be single-shaft magnetic sensors, multi-shaft magnetic sensors or combinations thereof. In the present embodiment, the first magnetic sensor 140 and the second magnetic sensor 150 are exemplified as single-shaft magnetic sensors, which may sense a magnetic field element on the second direction D2. The multi-shaft magnetic sensor is, for example, a double-shaft magnetic sensor or a tri-shaft magnetic sensor, which may, for example, sense the magnetic field element of any two directions of the first direction D1, the second direction D2 and the third direction D3, or sense the magnetic field element of the first direction D1, the second direction D2 and the third direction D3.

Figure 3A:
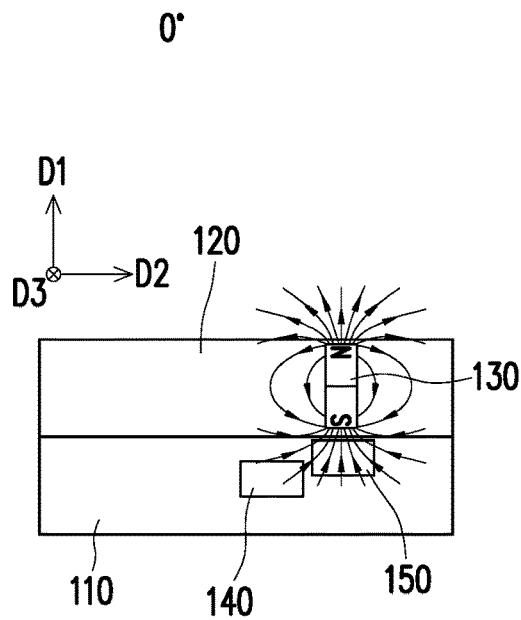
FIG. 3A, FIG. 3B, FIG. 3C, FIG. 3D and FIG. 3E respectively show simplified drawings of statuses of the angle sensing device when inclined angles of the second object with respect to the first object in FIG. 1 are 0 degree, 90 degrees, 180 degrees, 270 degrees and 360 degrees.
Figure 3B:
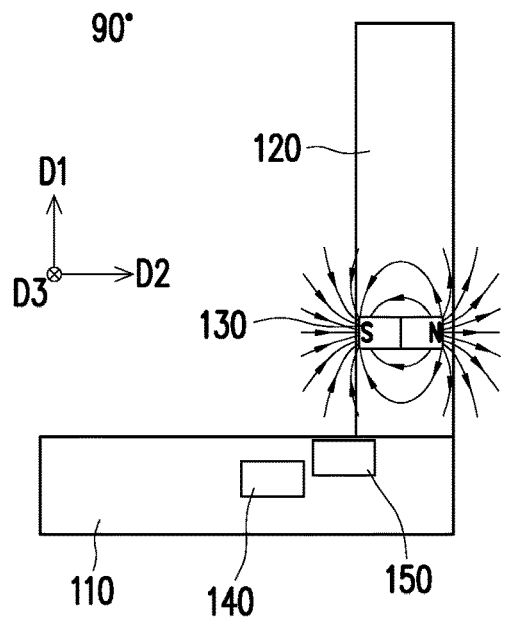

FIG. 3A, FIG. 3B, FIG. 3C, FIG. 3D and FIG. 3E respectively show simplified drawings of statuses of the angle sensing device when inclined angles of the second object with respect to the first object in FIG. 1 are 0 degree, 90 degrees, 180 degrees, 270 degrees and 360 degrees. FIG. 4 is a relationship curve diagram of output voltages of the first magnetic sensor and the second magnetic sensor in the angle sensing device of FIG. 1 with respect to an inclined angle of a second object with respect to a first object. Please refer to FIG. 3A first. When the inclined angle θ of the second object 120 with respect to the first object 110 is 0 degree, the N pole of the magnetic field source 130 faces toward the first direction D1, and the S pole faces toward an opposite direction of the first direction D1; the first object 110 is located beneath the second object 120, long axes of the first object 110 and the second object 120 are parallel to each other; at the moment, the main magnetic field element is on the first direction D1, and since the first magnetic sensor 140 and the second magnetic sensor 150 are disposed at different positions, a magnetic field strength difference exists between the magnetic field that the first magnetic sensor 140 is in and the magnetic field that the second magnetic sensor 150 is in.

Please refer to FIG. 3B again. When the inclined angle θ of the second object 120 with respect to the first object 110 is 90 degrees, the N pole of the magnetic field source 130 faces toward the second direction D2, and the S pole faces toward an opposite direction of the second direction D2; the long axis of the first object 110 is perpendicular to the long axis of the second object 120; and the main magnetic field element sensed by the first magnetic sensor 140 and the second magnetic sensor 150 is on the opposite direction of the second direction D2. Since the first magnetic sensor 140 and the second magnetic sensor 150 are disposed at different positions, a magnetic field strength difference exists between the magnetic field that the first magnetic sensor 140 is in and the magnetic field that the second magnetic sensor 150 is in.

Figure 3C:
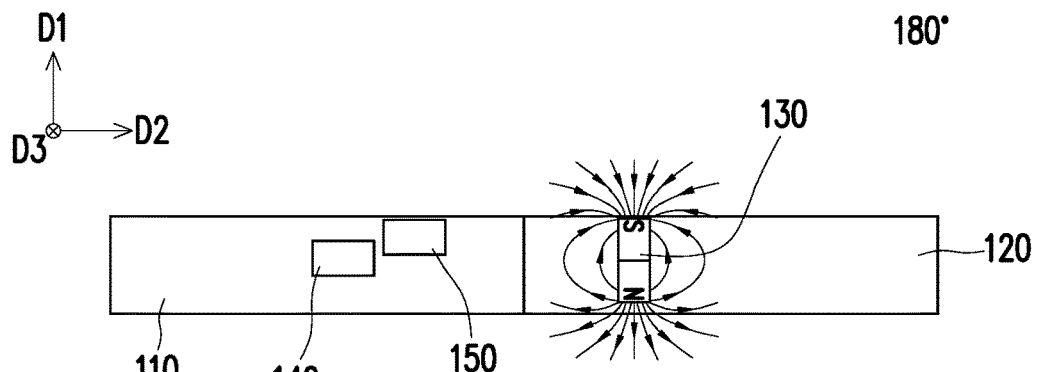
Figure 4:
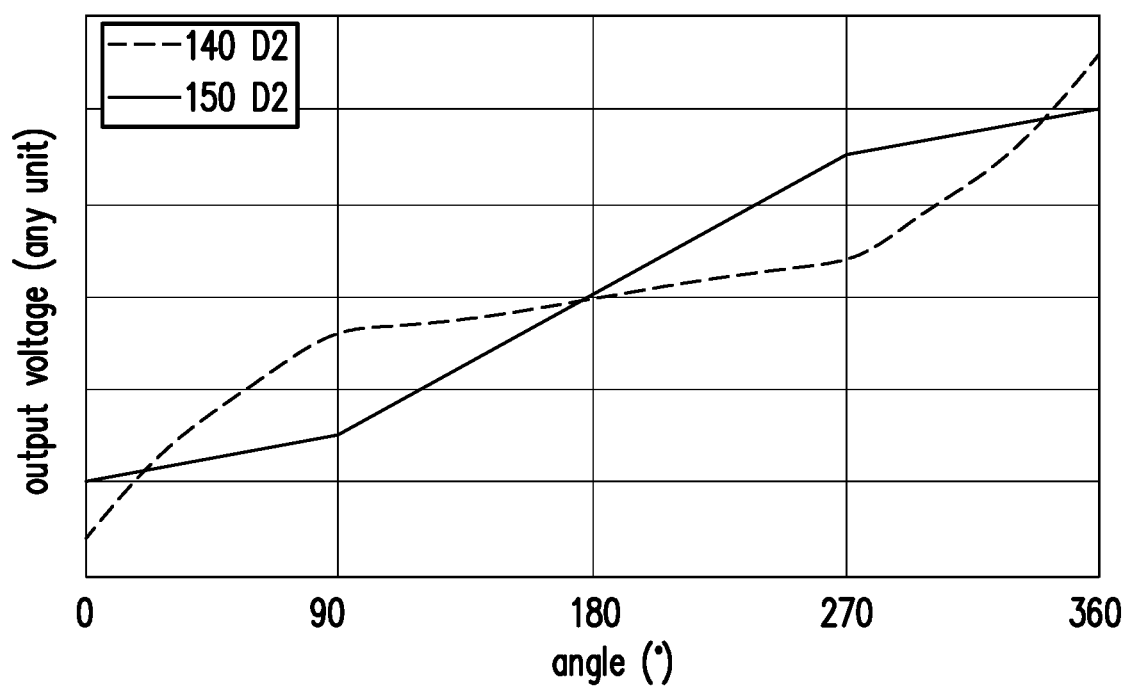
FIG. 4 is a relationship curve diagram of output voltages of the first magnetic sensor and the second magnetic sensor in the angle sensing device of FIG. 1 with respect to an inclined angle of a second object with respect to a first object.

Please refer to FIG. 3C. When the inclined angle θ of the second object 120 with respect to the first object 110 is 180 degrees, the S pole of the magnetic field source 130 faces toward the first direction D1, and the N pole faces toward the opposite direction of the first direction D1; the long axis of the first object 110 is parallel to the long axis of the second object 120, and the first object 110 is located on the left side of the second object 120; and the main magnetic field element sensed by the first magnetic sensor 140 and the second magnetic sensor 150 falls on the first direction D1. Since the first magnetic sensor 140 and the second magnetic sensor 150 are disposed at different positions, a magnetic field strength difference exists between the magnetic field that the first magnetic sensor 140 is in and the magnetic field that the second magnetic sensor 150 is in.

Figure 3D:
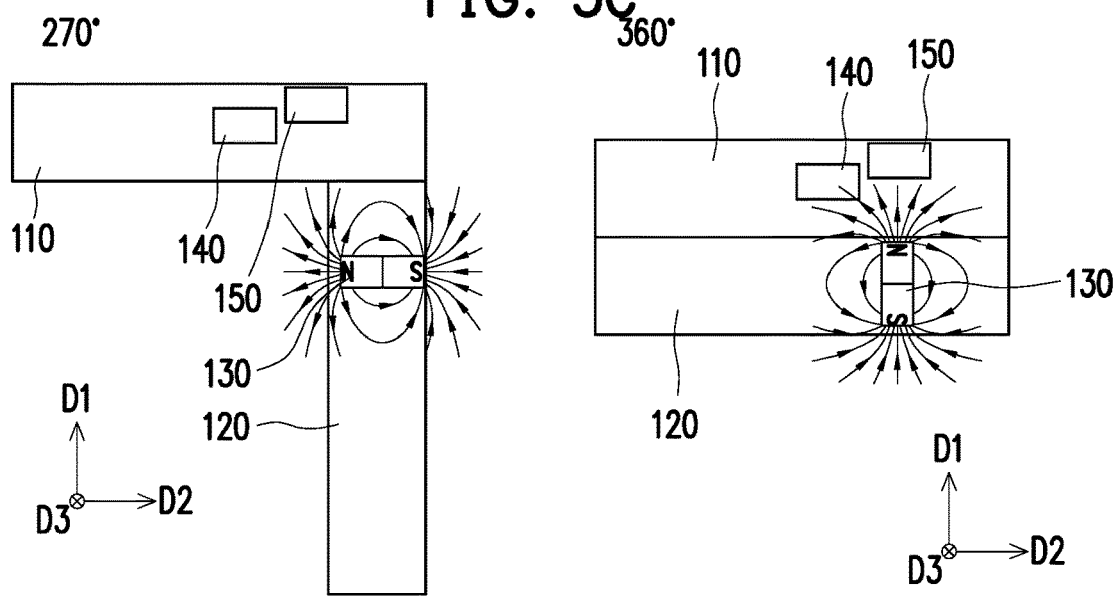

Please refer to FIG. 3D. When the inclined angle θ of the second object 120 with respect to the first object 110 is 270 degrees, the long axis of the first object 110 is perpendicular to the long axis of the second object 120, the S pole of the magnetic field source 130 faces toward the second direction D2, the N pole faces toward the opposite direction of the second direction D2, and the main magnetic field element sensed by the first magnetic sensor 140 and the second magnetic sensor 150 is on the second direction D2. Since the first magnetic sensor 140 and the second magnetic sensor 150 are disposed at different positions, a magnetic field strength difference exists between the magnetic field that the first magnetic sensor 140 is in and the magnetic field that the second magnetic sensor 150 is in.

Figure 3E:
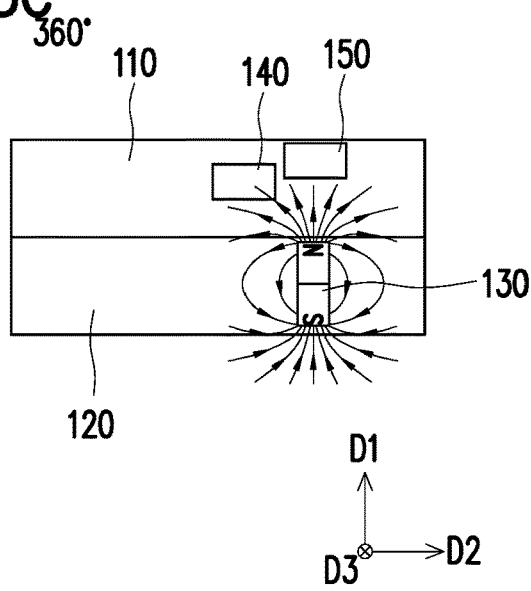

Please refer to FIG. 3E. When the inclined angle θ of the second object 120 with respect to the first object 110 is 360 degrees, the long axis of the second object 120 is parallel to the long axis of the first object 110, the second object 120 is beneath the first object 110, and the main magnetic field element sensed by the first magnetic sensor 140 and the second magnetic sensor 150 is on the first direction D1. Since the first magnetic sensor 140 and the second magnetic sensor 150 are disposed at different positions, a magnetic field strength difference exists between the magnetic field that the first magnetic sensor 140 is in and the magnetic field that the second magnetic sensor 150 is in.

In FIG. 3A, the N pole and S pole of the magnetic field source 130 are perpendicularly placed; however, in other embodiments, the N pole and S pole of the magnetic field source 130 may also be horizontally placed, tilted or placed in other suitable ways.

Please refer to FIG. 4. In FIG. 4, a curve marked with "140 D2" represents a relationship curve of an output voltage correspondingly outputted by the magnetic field element on the second direction D2 sensed by the first magnetic sensor 140 with respect to the inclined angle θ, and a curve marked with "150 D2" represents a relationship curve of an output voltage correspondingly outputted by the magnetic field element on the second direction D2 sensed by the second magnetic sensor 150 with respect to the inclined angle θ. It may be known from FIG. 4 that the first magnetic sensor 140 has a higher sensitivity when the inclined angle θ is 0 to 90 degrees and 270 to 360 degrees (because the slope of the curve is larger at the moment), and the second magnetic sensor 150 has a higher sensitivity when the inclined angle θ is 90 to 270 degrees.

In the present embodiment, an angle sensing device 170 further includes a controller 170 electrically connected to the first magnetic sensor 140 and the second magnetic sensor 150. The controller 170 may determine a size of the inclined angle θ measured by the angle sensing device 170 according to the output voltages of the first magnetic sensor 140 and the second magnetic sensor 150. In an embodiment, the controller 170 may alternately use the output voltages of the first magnetic sensor 140 and the second magnetic sensor 150 to determine the size of the inclined angle θ. For example, the inclined angle θ of 0 to 90 degrees and 270 to 360 degrees is a sensitivity area of the first magnetic sensor 140, the inclined angle θ of 90 to 270 degrees is a sensitivity area of the second magnetic sensor, and the controller 170 may determine the output voltage of which sensor to adopt based on the sensitivity area of which sensor that the inclined angle θ falls in, so as to determine the measured size of the inclined angle θ. In other words, if the inclined angle θ corresponded by the output voltage measured by the first magnetic sensor 140 and the second magnetic sensor 150 is at 0 to 90 degrees or 270 to 360 degrees, the controller 170 adopts the output voltage of the first magnetic sensor 140 to determine the measured size of the inclined angle θ. Otherwise, if the inclined angle θ corresponded by the output voltage measured by the first magnetic sensor 140 and the second magnetic 150 is at 90 to 270 degrees, the controller 170 adopts the output voltage of the second magnetic sensor 150 to determine the measured size of the inclined angle θ.

In an embodiment, the controller 170 is, for example a central processing unit (CPU), a microprocessor, a digital signal processor (DSP), a programmable controller, a programmable logic device (PLD), other similar devices, or a combination thereof, and the disclosure is not limited thereto. In addition, in an embodiment, each function of the controller 170 may be implemented as a plurality of program codes. These program codes may be stored in a memory and executed by the controller 170. Alternatively, in an embodiment, each function of the controller 170 may be implemented as one or a plurality of circuits. The disclosure does not limit whether to use a software or a hardware to implement each function of the controller 170.

Figure 5:
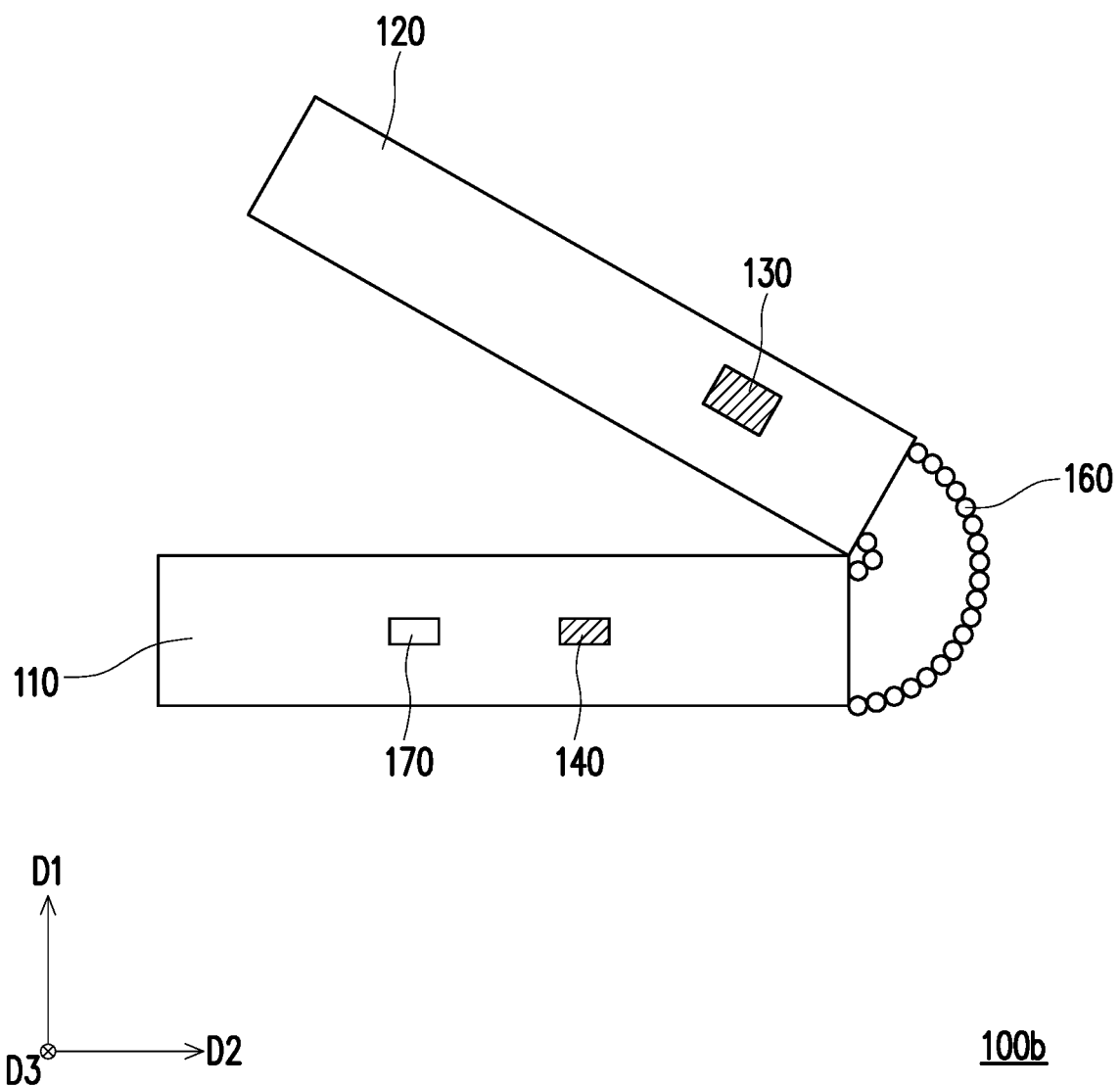
FIG. 5 is a sectional schematic view of an angle sensing device of another embodiment of the disclosure.
Figure 6:
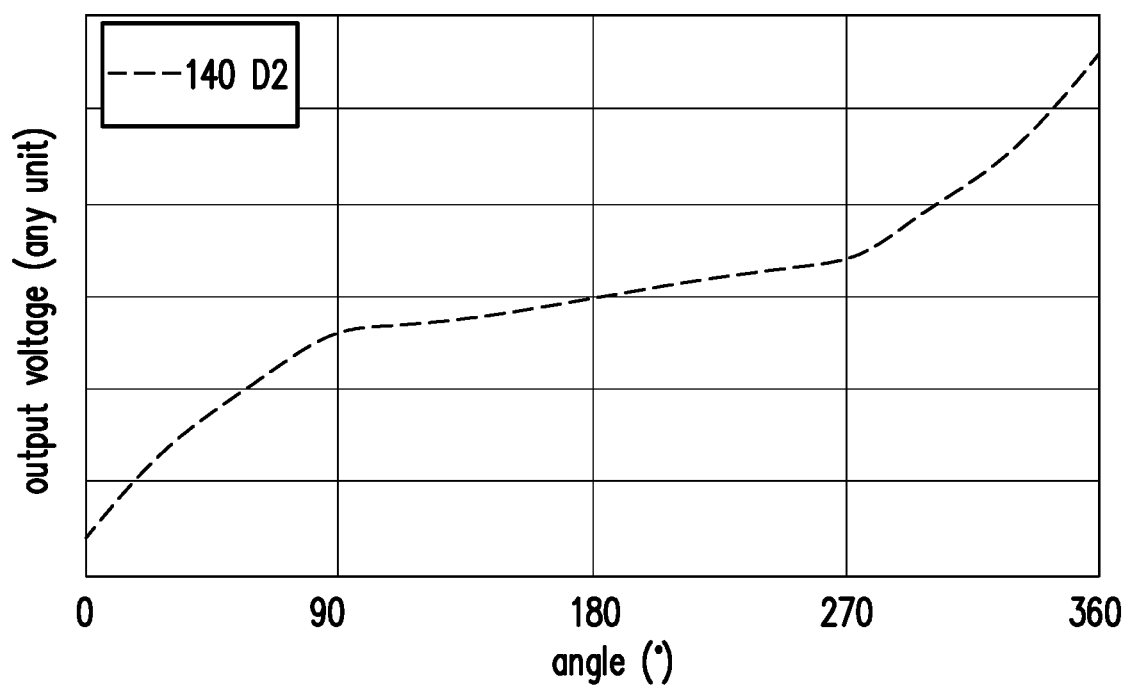
FIG. 6 is a relationship curve diagram of an output voltage of the first magnetic sensor in the angle sensing device of FIG. 5 with respect to an inclined angle of a second object with respect to a first object.

FIG. 5 is a sectional schematic view of an angle sensing device of another embodiment of the disclosure. FIG. 6 is a relationship curve diagram of an output voltage of the first magnetic sensor in the angle sensing device of FIG. 5 with respect to an inclined angle of a second object with respect to a first object. Please refer to FIG. 5 first. An angle sensing device 100b of the present embodiment is similar to the angle sensing device 100 of FIG. 1, and main differences of the two devices are as follows. The angle sensing device 100b of the present embodiment has the first magnetic sensor 140, but does not have the second magnetic sensor 150 as shown in FIG. 1. In other words, in the present embodiment, the angle sensing device 100b has a single magnetic sensor (which is the first magnetic sensor 140), and the first magnetic sensor 140 may be a multi-shaft magnetic sensor (such as a double-shaft magnetic sensor or a tri-shaft magnetic sensor) or a single-shaft magnetic sensor.

In addition, the first magnetic sensor 140 and the magnetic field source 130 are both disposed outside the rotating gear 160, and the controller 170 is electrically connected to the first magnetic sensor 140. In FIG. 6, the curve marked with "140 D2" represents a relationship curve of the output voltage correspondingly outputted by the magnetic field element on the second direction D2 sensed by the first magnetic sensor 140 with respect to the inclined angle θ. It may be known from FIG. 6 that the sensitivity of the first magnetic sensor 140 to the magnetic field element on the second direction D2 is higher when the inclined angle is 0 to 90 degrees and 270 to 360 degrees, and the sensitivity is lower when the inclined angle is 90 to 270 degrees. Therefore, the first magnetic sensor 140 may adopt a double-shaft magnetic sensor, which may, for example, sense biaxial magnetic field elements such as the first direction D1 and the second direction D2, and the controller 170 may adopt the voltage signal correspondingly outputted by the magnetic field element sensing the second direction D2 to determine the size of the inclined angle θ when the inclined angle θ is 0 to 90 degrees or 270 to 360 degrees, and the controller 170 adopts the voltage signal correspondingly outputted by the magnetic field element sensing the first direction D1 to determine the size of the inclined angle θ when the inclined angle θ is 90 to 270 degrees.

Alternatively, in another embodiment, the first magnetic sensor 140 may be a magnetic sensor that adopts a single-shaft, such as a magnetic sensor sensing the magnetic field element on the second direction D2; and, although the sensitivity of the first magnetic sensor 140 is lower when the inclined angle θ is 90 degrees to 270 degrees, sensing with a slightly lower accuracy may still be conducted to obtain a size of the inclined angle θ with a lower accuracy.

Based on the above, in the angle sensing device of the embodiments of the disclosure, the method of connecting the first magnetic sensor and the magnetic field source respectively to the first object and the second object and using the first magnetic sensor to sense the change of the magnetic field generated by the magnetic field source is adopted to measure the angle between the first object and the second object. Therefore, the angle sensing device of the embodiments of the disclosure may implement angle sensing without installing the magnetic sensor on the rotating shaft.

Although the disclosure has been disclosed in the above embodiments, the embodiments are not intended to limit the disclosure. It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalent.

What is claimed is:

1. An angle sensing device comprising:
a first object;
a second object adapted to be rotated with respect to the first object, so that an inclined angle of the second object with respect to first object is changed;
a magnetic field source connected to the second object;
a first magnetic sensor connected to the first object and configured to sense a magnetic field generated by the magnetic field source; and
a second magnetic sensor connected to the first object and configured to sense the magnetic field generated by the magnetic field source,
wherein, when the second object is rotated with respect to the first object, the magnetic field sensed by the first magnetic sensor changes, so that an output signal of the first magnetic sensor corresponding to the magnetic field changes,
when the second object is rotated with respect to the first object, a magnetic field change sensed by the first magnetic sensor is different from a magnetic field change sensed by the second magnetic sensor, and
the first magnetic sensor and the second magnetic sensor are respectively located on a first reference plane and a second reference plane, and the magnetic field source is located on a third reference plane; the first reference plane, the second reference plane, and the third reference plane are all parallel to a rotating shaft of the second object rotating with respect to the first object; the first reference plane is parallel to the second reference plane, and when the second object is rotated with respect to the first object, an inclined angle of the third reference plane with respect to the first reference plane is changed.

2. The angle sensing device according to claim 1, further comprising a rotating gear connected to the first object and the second object, wherein the second object is rotated with respect to the first object through the rotating gear, and the first magnetic sensor and the magnetic field source are both disposed outside the rotating gear.

3. The angle sensing device according to claim 1, wherein an orthographic projection of the second magnetic sensor on the first reference plane does not overlap with the first magnetic sensor.

4. The angle sensing device according to claim 3, wherein a distance between the orthographic projection of the second magnetic sensor on the first reference plane and the rotating shaft is different from a distance between the first magnetic sensor and the rotating shaft.

5. The angle sensing device according to claim 1, further comprising a rotating gear connected to the first object and the second object, wherein the second object is rotated with respect to the first object through the rotating gear, and the first magnetic sensor, the second magnetic sensor and the magnetic field source are all disposed outside the rotating gear.

6. The angle sensing device according to claim 1, wherein the first magnetic sensor and the second magnetic sensor are single-shaft magnetic sensors, multi-shaft magnetic sensors or combinations thereof.

7. The angle sensing device according to claim 1, wherein the first magnetic sensor is a multi-shaft sensor.

8. The angle sensing device according to claim 1, wherein the first object and the second object are two substrates.

9. The angle sensing device according to claim 1, wherein the magnetic field source is a permanent magnet or an electromagnet.

* * * * *